United States Patent [19]

Skjeldal

[11] 4,385,935

[45] May 31, 1983

[54] METHOD OF PRODUCING LIGHT WEIGHT CEMENT FOR USE OF CEMENTATION OF OIL AND GAS WELLS

[75] Inventor: Sigve Skjeldal, Hovik, Norway

[73] Assignee: Elkem A/S, Oslo, Norway

[21] Appl. No.: 324,559

[22] Filed: Nov. 24, 1981

Related U.S. Application Data

[63] Continuation of Ser. No. 198,668, Oct. 20, 1980, abandoned, which is a continuation-in-part of Ser. No. 177,872, Aug. 14, 1980, abandoned.

[30] Foreign Application Priority Data

Aug. 16, 1979 [NO] Norway .................................. 792673

[51] Int. Cl.$^3$ ............................................. C04B 7/02
[52] U.S. Cl. ...................................... 106/98; 166/292
[58] Field of Search ................... 106/98; 166/292, 293

[56] References Cited

U.S. PATENT DOCUMENTS

| 3,131,075 | 4/1964 | Brooks | 166/293 |
| 4,046,583 | 9/1977 | Collepardi | 106/98 |
| 4,111,711 | 9/1978 | Kiehl et al. | 106/98 |
| 4,118,242 | 10/1978 | Kjohl et al. | 106/98 |

FOREIGN PATENT DOCUMENTS

| 2324593 | 9/1976 | France | 106/98 |
| 918884 | 2/1963 | United Kingdom | 106/98 |
| 1468239 | 3/1977 | United Kingdom | 106/98 |
| 1495811 | 12/1977 | United Kingdom | 106/98 |
| 1506507 | 4/1978 | United Kingdom | 106/98 |
| 1532178 | 11/1978 | United Kingdom | 106/98 |
| 1537501 | 12/1978 | United Kingdom | 106/98 |

Primary Examiner—James Poer
Attorney, Agent, or Firm—Eyre, Mann, Lucas & Just

[57] ABSTRACT

A cement slurry of low specific density for cementation of oil and gas wells is produced by mixing oil-well cement with finely divided emission products comprising amorphous silica dust which has been obtained during the electrothermal preparation of ferrosilicon and/or silicon metal, water, and any desirable dispersion components, the emission products being added in an amount in the range of 1–50% of the total weight of dry material. The emission products can either be mixed with the cement while both components are in the dry state whereupon there is added a sufficient quantity of water in order to obtain a desired specific weight of the slurry or first mixed with water and any other desired dispersion components and this slurry is mixed with the oil-well cement.

4 Claims, No Drawings

METHOD OF PRODUCING LIGHT WEIGHT CEMENT FOR USE OF CEMENTATION OF OIL AND GAS WELLS

This is a continuation of application Ser. No. 198,668, filed Oct. 20, 1980, which was a continuation-in-part of application Ser. No. 177,872, filed Aug. 14, 1980, both now abandoned.

The invention relates to a method of producing a cement slurry of low specific weight suitable for use in the cementation of oil-and gas wells. It also relates to the composition of the cement slurry.

In the cementation of oil-or gas wells a cement slurry is pumped into the well through a form pipe. The slurry will gradually fill the empty space between the wall of the pipe and the wall of the well. The specific weight of the cement slurry is of the greatest importance in the process of cementation of the well. For instance, in drilling wells through high pressure zones, a cement slurry with a high specific weight is required in order to resist and control the flowing during the cementation process. However, in drilling wells through low pressure zones, as well as zones in which drilling mud may easily penetrate, it is necessary to utilize a cement slurry with a low specific weight. An object of the invention is to produce a cement slurry of low specific weight which is suitable for the cementation of oil and gas wells.

It is known that the specific weight of a cement slurry can be reduced by increasing the amount of water in the slurry. In order to absorb the increased quantity of water, other materials such as bentonite, pozzolan, diatomaceous earth, perlite, water glass and/or gilsonite are added. Of these materials, bentonite is today most frequently used in cement slurries, and usually employed in concentration constituting from 1–12% of the weight of the cement. By addition of 12% bentonite, one will obtain a specific weight of the slurry of 12.6 lbs./gallons corresponding to 15 kg/dm. When using water glass, pozzolan and diatomaceous earth, the relatively high content of silica in these materials will tend to bind that calcium hydroxide which is formed during the hardening of the cement and transform it to a more insoluble and stable component. Therefore, the employment of these materials will result in a relatively higher strength after hardening than is obtained through the use of bentonite.

It has been discovered that finely divided amorphous silica dust which has been obtained as an emission product during the electrothermal preparation of ferrosilicon and/or silicon metal can be used in the cement slurries for cementation of oil-gas wells.

In the method according to the invention, the amorphous silica dust are mixed with an API (American Petroleum Institute) approved oil-well cement. The amount of amorphous silica dust (obtained as an emission product) which is to be added is in the range of 1–50% by weight of the dry materials.

The emission products comprise amorphous silica in the range of from 82–95% of the total emission product. For example, the amorphous silica particles may comprise at least 82% by weight of $SiO_2$, will have a real density of approximately 2.2–2.25 g/cm$^2$ and will have a specific surface area of 18–22 m$^2$/g, the particles being substantially spherical, and wherein at least 60% by weight of the particles have a particle size less than 1 micron. It is, of course, well known that variation of these values is readily possible depending upon the parameters of the electrothermal processing.

The amorphous silica dust or the emission products comprising chiefly the amorphous $SiO_2$ can either be mixed in the dry state with the oil well cement to which there is then added a sufficient quantity of water to obtain a slurry having specific densities in the range of 10–16 lbs./gallon corresponding to 1.19–1.91 kg/dm$^3$. As is known, the amount of water can be reduced by the addition of dispersion materials. Of course, other known concrete additives may also be used as desired.

It will be appreciated that it is also possible to produce a slurry of the emission products and any dispersion components and to deliver this product as a slurry to a site where it will be mixed with the oil well cement. The ratio of mixture in this case and the specific weight will remain the same as when the emission products are mixed with the cement in the dry state.

By mixing a ratio of amorphous silica dust/cement of 33:67, there may be obtained specific weights in the range of 11.5–15.5 lbs./gallon corresponding to 1.37–1.85 kg/dm$^3$ and a compressive strength of 3890 psi corresponding to 27.3 kg/cm$^2$ with dispersion components and 440 psi corresponding to 30.93 kg/cm$^2$ without additives. The compressive strength here referred to are obtained after 24 hours at 95° F. corresponding to 35° C. at atmospheric pressure. For instance, the addition of a quantity of water amounting to 92.7% by weight of the mixture will give a specific weight of the slurry of 12.6 lbs/gallon corresponding to 15 kg/dm$^2$. If a higher specific density is desired a dispersion component must be added.

Upon hardening, the above described slurry will provide a tight concrete with few pores and high compression strength. The density is highly important, particularly in offshore operations, in order to prevent the penetration of the oil and gas in one formation into another formation.

What is claimed is:

1. The improved method of cementing the space between the interior wall of a well and the exterior wall of an internal tube therein with a low-density pumpable slurry of cement used in oil and gas well exploration which comprises the steps of:
    (a) mixing an oil and gas well cement with water and particulate silica formed by precipitating the fumes generated by an electrometallurgical smelting furnace for producing silicon or ferrosilicon, said particulate silica having a surface area from about 18 to about 22 m$^2$ per gram, the proportion of said particulate silica to cement in said slurry being about one part of silica for each two parts of cement;
    (b) adjusting the density of said slurry by adding sufficient water to provide a low density pumpable aqueous slurry of not over about 12.6 pounds per gallon; and
    (c) pumping said slurry into the space between said tube and interior wall of the well for cementation thereof.

2. The method of claim 1 wherein the particulate silica and cement are mixed in a dry state followed by addition of water to form the low density slurry.

3. The method of claim 1 wherein dispersion components chosen from the group consisting of bentonite, pozzolan, diatomaceous earth, perlite, water glass and gilsonite are added to vary the density of said slurry from about 11.5 to about 15.5 pounds per gallon.

4. The method of claim 1 wherein an aqueous slurry comprising the said silica and water is formed and thereafter the resulting silica slurry is mixed with said oil and gas well cement.

* * * * *